United States Patent [19]

Forge

[11] Patent Number: 4,638,420
[45] Date of Patent: Jan. 20, 1987

[54] APPARATUS FOR MAINTAINING CONSTANT FREQUENCY IN A DC TO SQUARE WAVE INVERTER

[75] Inventor: Charles O. Forge, Los Altos, Calif.

[73] Assignee: Boschert Inc., Milpitas, Calif.

[21] Appl. No.: 717,782

[22] Filed: Apr. 1, 1985

[51] Int. Cl.$^4$ ............................................. H02M 7/537
[52] U.S. Cl. ....................................... 363/132; 363/98; 323/289
[58] Field of Search ............................. 363/17, 22–26, 363/97–98, 131–134; 323/289; 307/270, 280, 282, 300

[56] References Cited

U.S. PATENT DOCUMENTS 3,828,208 8/1974 Kelleher .......................... 323/289 X
4,302,807 11/1981 Mentler ............................ 323/289 X

FOREIGN PATENT DOCUMENTS 0026571 2/1983 Japan ...................................... 363/132
1001394 2/1983 U.S.S.R. ................................ 363/132

OTHER PUBLICATIONS

Hitchcock et al., "Low Energy Base Drive for PWM Full-Bridge Converter Switching Regulator", IBM Tech. Disclosure Bulletin, vol. 27, No. 1B, Jun. 1984, pp. 676–678.

*Primary Examiner*—Peter S. Wong
*Attorney, Agent, or Firm*—Kenneth E. Leeds; Alan H. MacPherson; Steven F. Caserza

[57] ABSTRACT

A DC to square wave inverter (100) includes a saturable transformer (T102). The current through the saturable transformer (T102) is determined by the load current of the inverter (100). Current through the saturable transformer (T102) flows through two diodes (D100, D101) and through the base emitter junction of a power transistor (Q101). As the load current increases, the current through the diodes (D100, D101) and the power transistor (Q101) increases. This causes an increase in the voltage across the saturable transformer (T102), thus decreasing the amount of time it takes for the saturable transformer to go into saturation. A negative resistance element is coupled in series between the diodes (D100, D101) and the saturable transformer (T102). The voltage rise across the negative resistance element increases in response to increased current coming out of the saturable transformer (T102) and through the diodes (D100, D101). Similarly, the voltage rise across the negative resistance element decreases when the current out of the saturable transformer (T102) decreases. This is because the negative resistance element is actually a resistor (R100) coupled across a second transformer (T103). The current through the windings of the second transformer (T103) is fixed by the current through the saturable transformer (T102). However, the current through the second transformer (T103) flows in a direction opposite the current from the saturable transformer (T102). Accordingly, the negative resistance element cancels any increased voltage drop across the diodes and transistor caused by increased load current.

25 Claims, 7 Drawing Figures

APPARATUS FOR MAINTAINING CONSTANT FREQUENCY IN A DC TO SQUARE WAVE INVERTER

BACKGROUND OF THE INVENTION

1. Field of the Invention

This invention relates to power supplies and more specifically, to power supplies which generate a square wave from a DC input (inverters).

2. Description of the Prior Art

Inverters receive a DC voltage and generate therefrom a square wave output voltage. FIG. 1 illustrates an inverter 10 which performs this function. Inverter 10 includes a pair of terminals 12a and 12b, across which a DC voltage (typically, about 160 volts) is applied. Inverter 10 includes a power transistor Q1 and a power transistor Q2. In operation, power transistor Q1 is on while power transistor Q2 is off, and vice versa. This causes a square wave voltage to be provided across the primary winding T1P of a first transformer T1. This in turn causes a square wave output voltage to be generated across the secondary winding T1S of transformer T1. The period for the square wave provided by inverter 10 is determined by the characteristics of a second transformer T2. Second transformer T2 has three windings: a set of windings T2A, T2B and T2C.

In operation, when transistor Q1 is on, current flows from the emitter of transistor Q1 through winding T2A and through primary winding T1P of transformer T1. When that happens, a current also flows through winding T2B of transformer T2. Typically, winding T2A has one turn while winding T2B has eight turns. Therefore, if a current $I_{T2A}$ flows through winding T2A, then a current $I_{T2B}=I_{T2A}/8$ will flow through winding T2B. Current $I_{T2B}$ then flows through a diode D1 and into the base of transistor Q1. The voltage across winding T2B equals the voltage across diode D1 plus the voltage across the base emitter junction of transistor Q1. Typically, this voltage equals approximately 1.4 volts. A capacitor C1 is connected across diode D1. Therefore, while transistor Q1 is on, a voltage of one diode drop, or approximately 0.7 volts, is applied across the terminals C1A and C1B of capacitor C1, thus charging capacitor C1 to 0.7 volts.

As is well understood in the art, when a voltage is applied across a saturable core, such as the core associated with winding T2B, eventually the saturable core saturates. When that happens, the voltage across winding T2B drops to zero. Because of this, a reverse current will flow through diode D1 and the base of transistor Q1 (because of charge stored in the PN junction of diode D1), causing transistor Q1 to turn off. Further, because capacitor C1 has been charged to a voltage of 0.7 volts, when the voltage on terminal C1A of capacitor C1 drops to a potential equal to the potential of the emitter of transistor Q1, the voltage on terminal C1B of capacitor C1 drops to a voltage of −0.7 volts relative to the emitter voltage of transistor Q1. This turns off transistor Q1 even more rapidly. Because the reverse current out of the base of transistor Q1 falls to zero, and current can no longer flow through winding T2B of transformer T2 because transistor Q1 is shut off, the flux stored in transformer T2 causes a current to start flowing through winding T2C. When this happens, current flows in the direction of arrow A through a diode D2 and through the base of transistor Q2, causing transistor Q2 to turn on. The voltage across winding T2C equals the voltage drop across diode D2 plus the base emitter junction voltage drop across the base emitter junction of transistor Q2, or approximately 1.4 volts. Because the voltage across winding T2C equals 1.4 volts, the voltage across winding T2B equals −1.4 volts (the core of winding T2B is no longer saturated).

When transistor Q2 turns on, current flows through winding T2A and through the collector of transistor Q2. When transistor Q2 is on, the voltage across primary winding T1P of transformer T1 equals the negative of the voltage that appears across primary winding T1P when transistor Q1 is on. Transistor Q2 will remain on until the core of transformer T2 goes back into saturation. Specifically, since the voltage of 1.4 volts is constantly applied across winding T2C, eventually transformer T2 goes back into saturation in a polarity opposite that which occurs when transistor Q1 turns off. When that happens, zero volts appear across winding T2C and transistor Q2 turns off. A voltage then appears across winding T2B and a current sufficient to turn on transistor Q1 starts to flow.

It is seen that half the period of oscillation for inverter 10 is determined by the length of time it takes transformer T2 to go from positive to negative saturation, and the other half period of oscillation is determined by the lenght of time it takes transformer T2 to go from negative to positive saturation. This in turn is fixed, at least in part, by the physical dimensions of transformer T2 and the magnitude of the voltage appearing across windings T2B and T2C.

The voltages appearing across winding T2B and winding T2C are determined by the voltage drop across diode D1 and the base emitter junction of transistor Q1 and the voltage drop across diode D2 and the voltage drop across the base emitter junction of transistor Q2, respectively. Because diode D1 is not a perfect diode, and transistor Q1 is not a perfect transistor, some resistance is associated with these elements. Therefore, an increase in the current flowing through winding T2B causes an increase in the voltage drop across diode D1 and across the base emitter junction of transistor Q1. Similarly, an increase in the current across transformer winding T2C, causes the voltage drop across diode D2 and the voltage drop across the base emitter junction of transistor Q2 to increase. Thus, a large current through winding T2B and winding T2C (causing a larger voltage across these windings) will cause transformer T2 to go into saturation more rapidly than a small current through windings T2B and T2C. The current through winding T2B and winding T2C depends on the current flowing through winding T2A which, in turn, is determined by the current through primary winding T1P of transformer T1 which, in turn, depends upon the load current out of secondary winding T1S of transformer T1. It is thus seen that the greater the load current for inverter 10, the greater the frequency of oscillation of inverter 10. For various applications, this is undesirable. In fact, for some applications, it is desirable to have a slightly lower frequency and a slightly longer period when the load current is increased.

SUMMARY OF THE INVENTION

In accordance with this invention, a DC to square wave inverter is provided which supplies a square wave having a substantially constant frequency when the load current is increased. This is accomplished by providing a pair of circuit elements placed between the saturating core transformer and the base of the power transistors. These elements provide a voltage which counteracts the voltage drop caused by the series resistance of the diodes and the transistors. These elements include a first resistor coupled in series with the base of the first power transistor (e.g., transistor Q1), a second resistor coupled in series with the base of the second power transistor (e.g., transistor Q2) and a third transformer having a first and second winding coupled in series with the collector lead of each of the power transistors, a third winding coupled across the first resistor, and a fourth winding coupled across the second resistor, so that as the collector current of the power transistors increases, the current through the resistors increases. The orientation of the third winding of the third transformer is such as to cause the net current flowing through the first resistor to flow in a direction opposite the current flowing into the base of the first transistor. Therefore, the first resistor provides a voltage rise proportional to the current flowing through the series connected diode and transistor (corresponding to diode D1 and transistor Q1 in FIG. 1), thus counteracting the effect of increased load current on the voltage drop across the diode and the transistor base emitter junction. Because of this, the increased load current has a smaller effect on the voltage across winding T2B, thus preventing transformer T2 from going into saturation earlier. Similarly, the second resistor provides a voltage rise which counteracts the increase in voltage across diode D2 and transistor Q2 caused by an increase in load current. In this way, the power supply period becomes relatively insensitive to increased load current.

BRIEF DESCRIPTION OF THE DRAWINGS

FIG. 1 is a schematic diagram of a half-bridge inverter constructed in accordance with the prior art;

FIG. 2b is a schematic diagram of an alternative configuration of inverter 100 of FIG. 2a;

DETAILED DESCRIPTION

Figure 2A:
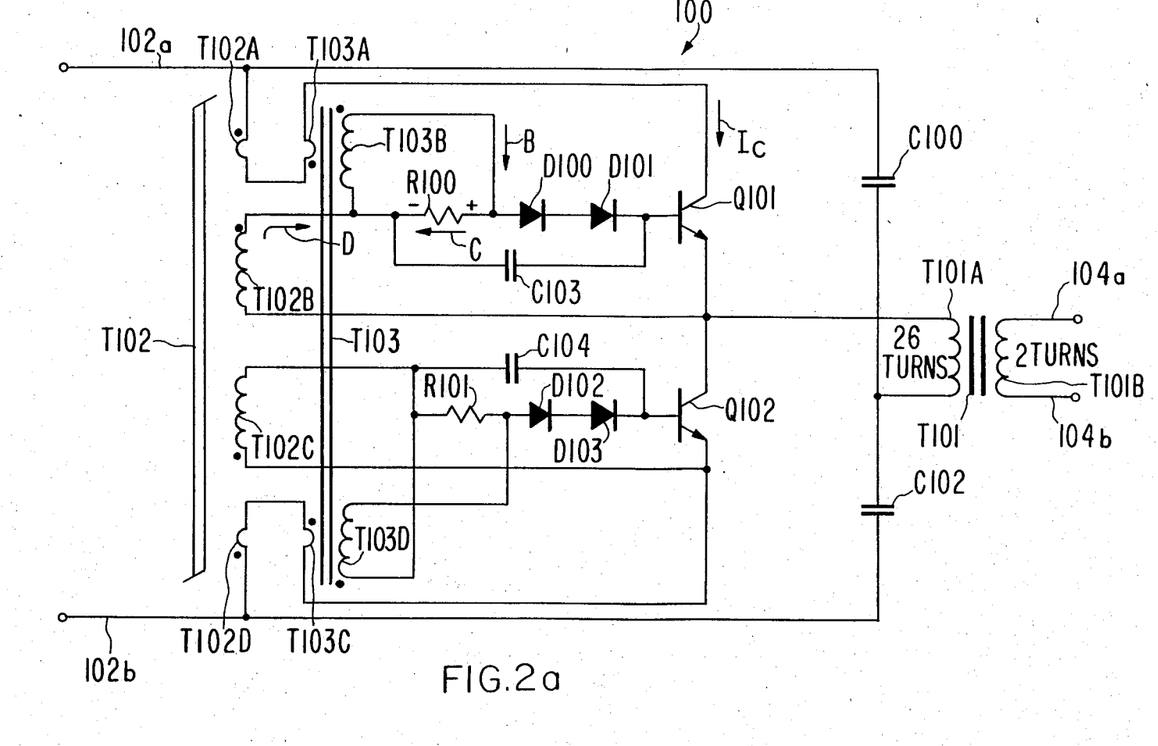
FIG. 2a is a schematic diagram of a half-bridge inverter constructed in accordance with a first embodiment of the invention.

Referring to FIG. 2a, an inverter 100 constructed in accordance with the preferred embodiment of the invention includes a first terminal 102a and a second terminal 102b. A DC voltage (typically about 160 volts but capable of being any appropriate voltage) is applied across terminals 102a and 102b. Inverter 100 receives this DC voltage and generates therefrom a square wave which appears across output terminals 104a and 104b. As was the case in the power supply of FIG. 1, inverter 100 includes a first power transistor Q101 and a second power transistor Q102. When power transistor Q101 is on, power transistor Q102 is off. When power transistor Q102 is on, power transistor Q101 is off. The collector of power transistor Q101 is coupled to terminal 102a via a winding T103A of a new transformer T103 and a winding T102A of a transformer T102. Therefore, when transistor Q101 is on, current flows from lead 102a through winding T102A, through winding T103A, through transistor Q101, through the primary winding of transformer T101 and onto capacitors C100 and C102. When current flows through winding T102A, current is induced across another winding T102B. This current, hereinafter designated as "$I_{T102B}$" flows through the parallel combination of a resistor R100 and winding T103B, a diode D100, a second diode D101, and into the base of transistor Q101. The voltage drop across winding T102B equals the voltage drop across resistor R100 plus the voltage drop across diode D100 plus the voltage drop across diode D101 plus the voltage drop across the base emitter junction of transistor Q101.

Transformer T102 is saturable. Therefore, the application of a voltage across winding T102B eventually drives transformer T102 into saturation. When that happens, the voltage across winding T102B drops to zero, causing zero current to flow through diode D100 and diode D101 and causing capacitor C103 to draw current out of the base of transistor Q101. This causes transistor Q101 to turn off. When transistor Q101 turns off, current through windings T102A and T102B cuts off and current through windings T102C and T102D starts to flow. The current through winding T102C flows through the parallel combination of a resistor R101 and winding T103D, through a diode D102, a diode D103, and into the base of transistor Q102. This causes transistor Q102 to turn on, causing current to flow from transformer T101, through the collector of transistor Q102, and out the emitter of transistor Q102.

As can be seen from FIG. 2, the collector current $I_C$ through transistor Q101 also flows through winding T103A. When this happens, a current $I_{T103B}$ flows through winding T103B in a direction indicated by arrow B. The relationship between the current flowing through winding T103A and the winding T103B is well known in the art and is fixed by the ratio of the number of turns of winding T103B to the numbers of turns of winding T103A, typically 7:1. Current through winding T103B flows through resistor R100 and back into winding T103B. The current through resistor R100 (in a direction indicated by arrow C) equals current $I_{T103B}$ flowing through winding T103B minus current $I_{T102B}$ flowing through winding T102B (in a direction indicated by arrow D). The voltage drop across resistor R100 is $$V_{R100} = R100 \times (I_{T103B} - I_{T102B}).$$

Since the current $I_{T103B}$ and $I_{T102B}$ are both proportional to the collector current $I_C$ of transistor Q101, then current $I_{T103B}$ and current $I_{T102B}$ are also proportional to each other, that is, $I_{T103B}$ equals some constant times $I_{T102B}$. Because of this, the voltage drop across resistor R100 can be rewritten as $V_{R100} = R100 \times K \times I_C$ where K is a constant determined by the turns ratio of transformer T103 and transformer T102. The current through R100 can be restated as $$I_{R100} = \frac{I_C}{N_{103}} - \frac{I_C}{N_{102}} = I_C \left( \frac{N_{102} - N_{103}}{N_{102} \times N_{103}} \right)$$

where $N_{102}$ is the ratio of the number of turns of winding T102A to the number of turns of winding T102B (typically 1 turn to 8 turns), and $N_{103}$ is the ratio of the number of turns of winding T103A to the number of turns of winding T103B (typically 1 turn to 7 turns). Thus $$K = \frac{N_{102} - N_{103}}{N_{102} \times N_{103}}$$

The value K can be either positive or negative. In a preferred embodiment, the value K is positive, and is selected to cancel the resistance of diodes D100, D101 and the base emitter junction of transistor Q101. Thus, if the output load current from transformer T101 is high, causing a large current to flow through the primary winding of transformer T101, this causes a large current to flow through windings T102A and T102B. This also causes more current to flow through diodes D100, D101 and into the base of transistor Q101. However, in this preferred embodiment, the additional voltage caused by the increased current through diodes D100, D101 and transistor Q101, is substantially cancelled by the voltage drop across resistor R100. Therefore, regardless of the added load current, the voltage across winding T102B will remain substantially the same as it would be if there were a lesser load current through the output of transformer T101. With the additional load current, transformer T102 will not go into saturation any sooner; hence the frequency of inverter 100 will not change substantially if load current increases.

The symmetrical structure consisting of windings T102C, T102D, T103C and T103D acts in a similar manner, causing the voltage drop across a resistor R101 to substantially cancel any increase in voltage drop across diodes D102 and D103 and the base emitter junction of transistor Q102 caused by increased load current through the secondary winding of transformer T101 while transistor Q102 is on.

In the embodiment of FIG. 2a, capacitor C103 is placed across resistor R100 and diodes D100 and D101. This is done because if capacitor D103 were connected across diodes D100 and D101 but not resistor R100, resistor R100 would cause a high frequency impedance which would degrade switching speed.

In a preferred embodiment of the invention, transformer T102 saturates in 25 μs, i.e., inverter 100 has a period of 50 μs. Transistors Q101 and Q102 are each part number MJE 13008, available from Motorola, Inc. Diodes D100, D101, D102, and D103 are part number IN4004, available from Motorola, Inc. Capacitors C103 and C104 are 2.2 μF 35 volt capacitors and capacitors C100 and C102 are 200 V 2 μF capacitors.

Resistors R100 and R101 typically have resistance values of 3.3 ohms. Transformer T101 is typically wound on a core such as part number H7B EE50Z, made by TDK of Japan. Transformers T102 and T103 are wound on cores such as part number H5C2T5-10-2.5, also manufactured by TDK.

Figure 2B:
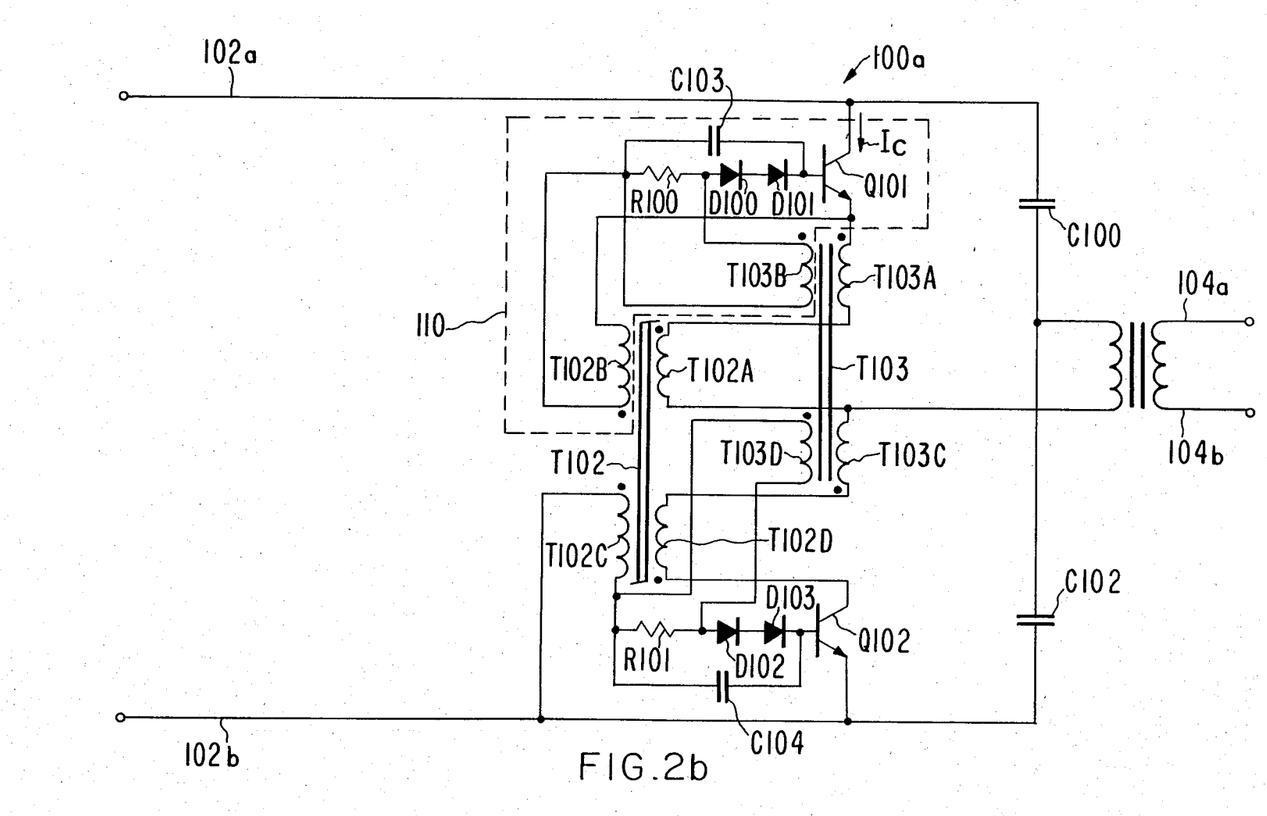

FIG. 2b is a schematic diagram of an alternative configuration of inverter 100. In FIG. 2b, terminal 102a is connected directly to the collector of transistor Q101. Windings T103A and T102A are coupled in series with the emitter of transistor Q101 and winding T102B. The circuit of FIG. 2b functions identically to inverter 100 of FIG. 2a. In inverter 100, current $I_C$ passes through windings T102A and T103A since windings T102A and T103A are coupled in series with the collector of transistor Q101. In FIG. 2b, current $I_C$ also passes through windings T102A and T103A. Because of Kirchoff's current law, the current flowing into the group of circuit elements within box 110 must equal the current flowing out of box 110, and the only current path out of box 110 runs through windings T102A and T1023A. Therefore, windings T102A and T103A in FIG. 2b are actually coupled in series with the collector of transistor Q101.

Similarly, while inverter 100 includes windings T102D and T103C coupled in series with the emitter of transistor Q102 and winding T102C, the inverter of FIG. 2b has windings of T103C and T102D coupled in series with the collector of transistor Q102. Those skilled in the art will recognize that the inverters of FIGS. 2a and 2b are essentially identical. The configurations illustrated in FIGS. 2a and 2b both come within the scope of the present invention. In addition, it is possible to construct an inverter in which windings T103A and T102A connected directly to the collector of transistor Q101 and have windings T103C and T102D connected directly to the collector of transistor Q102. In addition, it is possible to provide an inverter which instead of having two windings T103A and T103C as in FIG. 2a, has a single winding in series with primary winding T101A in the same way that winding T2A (FIG. 1) is in series with T1P. In such an embodiment, windings T102A and T102D could also be replaced with a single winding in series with winding T101A.

Figure 3A:
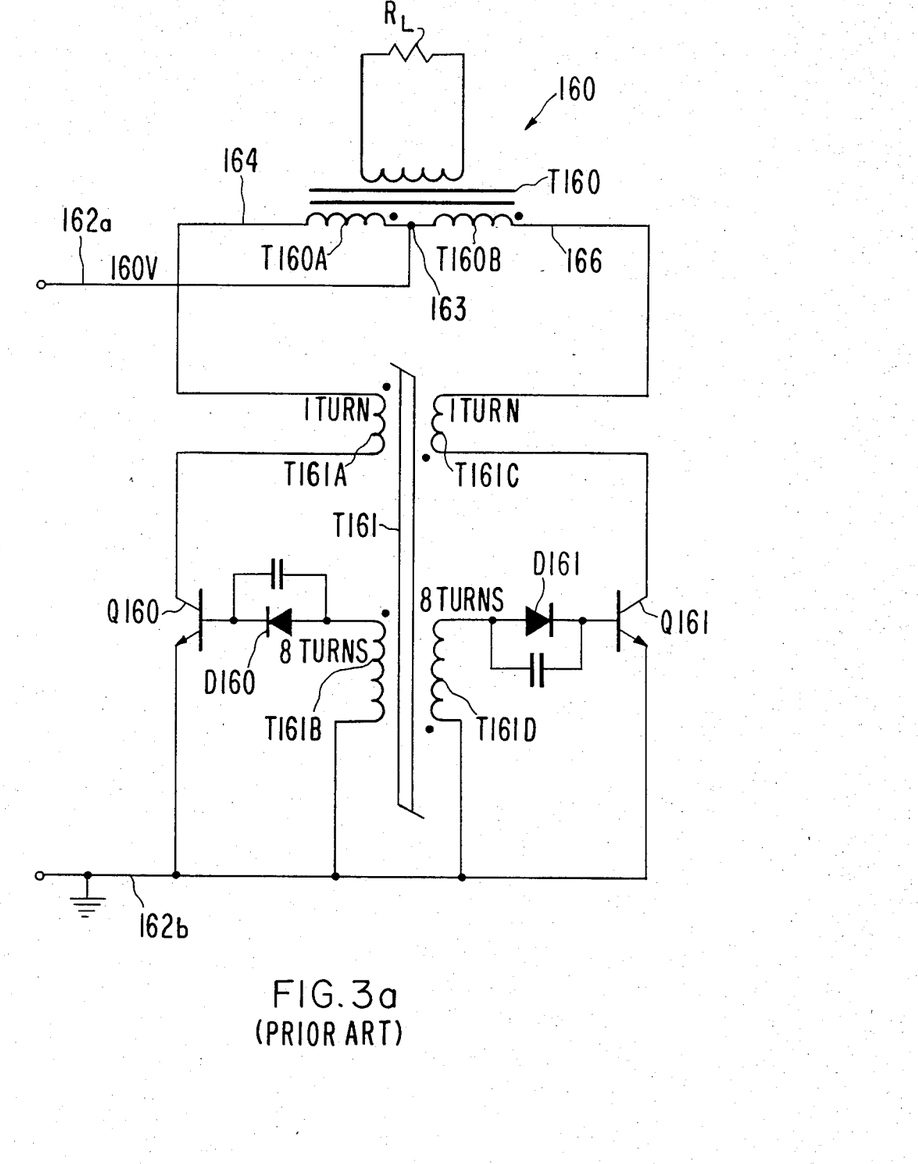
FIG. 3a is a push-pull inverter constructed in accordance with the prior art.

This invention can also be used in conjunction with a push-pull inverter. FIG. 3a is a schematic diagram of a push-pull inverter 160 constructed in accordance with the prior art. Push-pull inverter 160 includes a first input terminal 162a and a second input terminal 162b. In a typical embodiment, a DC voltage such as 160 volts is placed across terminals 162a and 162b. Terminal 162a is coupled to a center tap 163 of a transformer T160. The primary winding of transformer T160 includes a winding T160A and a winding T160B. Winding T160A is coupled to a first lead of a winding T161A of a saturable core transformer T161. A second lead of winding T161A is coupled to the collector of a transistor Q160, the emitter of which is coupled to terminal 162b. Similarly, winding T160B is coupled to a winding T161C of saturable core transformer T161. The second lead of winding T161C is coupled to the collector of a transistor Q161, the emitter of which is also tied to terminal 162b. Base current for transistor Q160 is provided from a winding T161B of transformer T161, and passes through a diode D160 and into the base of transistor Q160. Similarly, the base current for transistor Q161 flows out of a winding T161D of transformer T161, through a diode D161, and into the base of transistor Q161.

Transistors Q160 and Q161 alternatively turn on and off. When transistor Q160 is on, current flows through winding T160A, through winding T161A, through transistor Q160 and to terminal 162b. When that happens, the voltage potential present at a lead 164 of winding T160A is substantially close to ground potential, the voltage present at center tap 163 equals the voltage present at lead 162a, and the voltage present at a lead 166 of winding T160B equals twice the voltage present at lead 162a. When transistor Q160 turns off and transistor Q161 turns on, that situation is reversed, i.e., the voltage present at lead 166 is substantially at ground and the voltage present at lead 164 is approximately twice the voltage present at terminal 162a.

Saturable core transformer T161 controls the oscillation of push-pull inverter 160. When transistor Q160 is on, a voltage drop appears across winding T161B equal to the voltage drop across diode D160 and the voltage drop across the base emitter junction of transistor Q160. This voltage drop eventually drives transformer T161 into saturation and when that happens, current reverses and then stops flowing through diode D160 and the base of transistor Q160, and starts flowing into the base of transistor Q161, causing transistor Q161 to turn on. As was the case in the previous embodiments, when current through load RL increases, e.g., because of a decrease in the resistance of load RL, there is an increase in the current through the base of transistor Q160 when transistor Q160 is on, and through the base of transistor Q161 when transistor Q161 is on. This causes a greater amount of voltage to appear across windings T161B and T161D. This in turn drives transformer T161 into saturation earlier, thus increasing the frequency of oscillation.

Figure 3B:
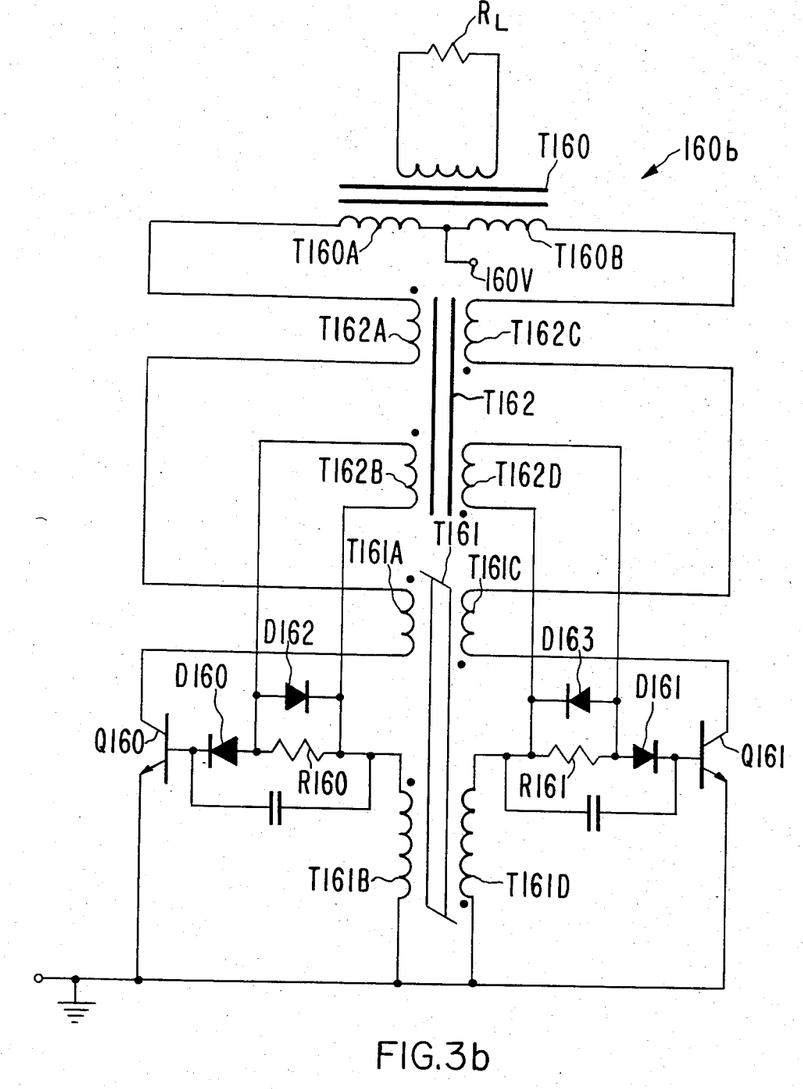
FIG. 3b is a push-pull inverter constructed in accordance with the present invention.

Referring to FIG. 3b, a push-pull inverter 160b is illustrated incorporating the improvement of an additional transformer T162. Transformer T162 includes a winding T162A through which the collector current of transistor Q160 flows. It is seen that a resistor R160 is placed in series between winding T161B and diode D160. Placed in parallel across resistor R160 is a winding T162B of transformer T162. The current flowing through winding T162B cancels the current through winding T161B that flows through resistor R160 and additionally substantially cancels the increase in voltage across diode D160 and the base emitter junction of transistor Q160 caused by increasing load current through load RL. Similar windings T162C and T162D perform the same function across a resistor R161.

It is noted that a diode D162 is connected across resistor R160, and a diode D163 is connected across resistor R161. Diode D162 limits the maximum possible voltage across resistor R160 when the load current through load RL is very high. This prevents excessively long oscillation periods, which could cause transformer T160 to saturate—an undesirable condition. Similarly, diode D163 limits the voltage rise across resistor R161. (A diode such as diode D162 can also be coupled across resistors R100 and R101 in the embodiment of FIG. 2a to limit the voltage across them as well.)

In one embodiment of this invention, windings T160A and T160B have 53 turns, the secondary winding of transformer T160 has 2 turns, windings T162A, T162C, T161A, and T161C each have one turn, windings T161B and T161D have 8 turns, and windings T162B and T162D have less than 8 turns, e.g., 7 turns.

Figure 4:
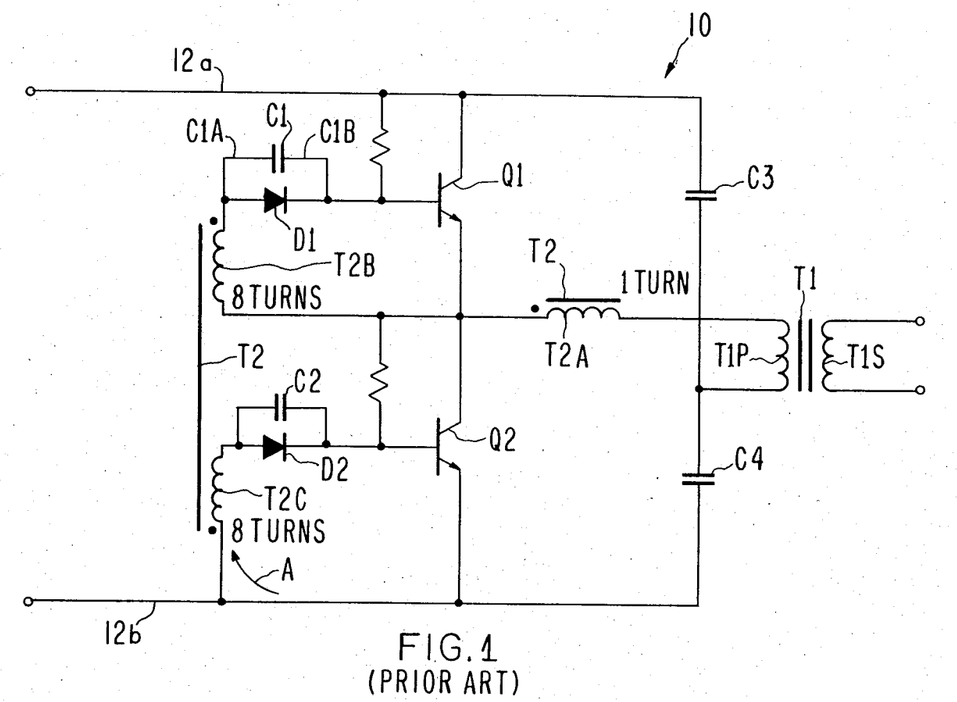
FIG. 4a is an illustration of a full-bridge inverter constructed in accordance with the prior art.
FIG. 4b is a full-bridge inverter constructed in accordance with the present invention.
Figure 4A:
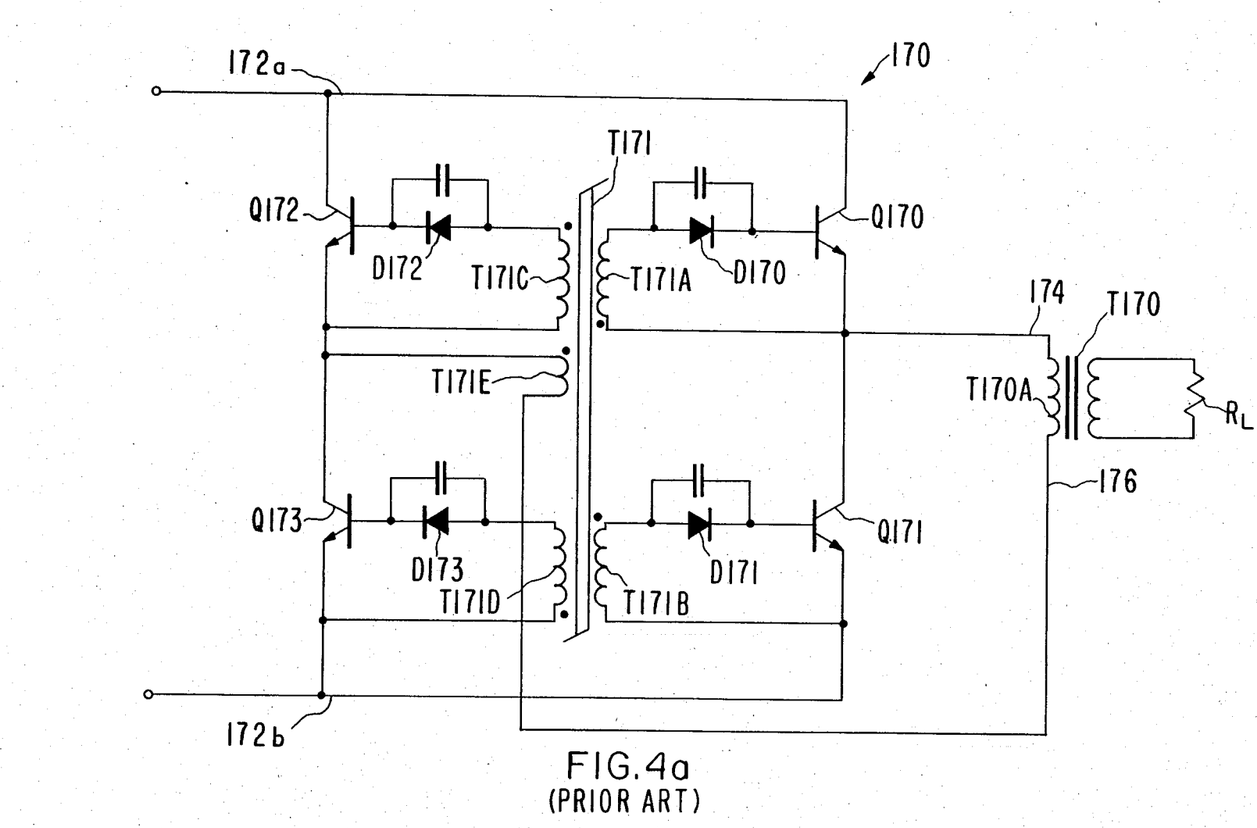

This invention can also be used with a full-bridge inverter. Referring to FIG. 4a, a full-bridge inverter 170 includes a first input terminal 172a and a second input terminal 172b. Typically, a DC voltage such as 160 volts is placed across terminals 172a and 172b. Full-bridge inverter 170 includes an output transformer T170. A primary winding T170A of transformer T170 includes a first lead 174 and a second lead 176. A switching power transistor Q170 is placed between terminal 172a and lead 174, while a second switching transistor Q171 is placed between lead 174 and terminal 172b. A third power transistor Q172 is placed in series with a winding T171E of a saturable core transformer T171 between terminal 172a and lead 176 while a fourth transistor Q173 is placed in series with winding T171E between lead 176 and terminal 172b. When transistor Q172 is on, transistor Q171 is on and while transistor Q170 is on, transistor Q173 is on. Therefore, while transistors Q172 and Q171 are on, current flows through transistor Q172, through winding T171E, into lead 176, through winding T170A, out lead 174, through transistor Q171, and onto terminal 172b. Similarly, when transistors Q170 and Q173 are on, current flows through transistor Q170, into lead 174, through winding T170A, out lead 176, through winding T171E, through transistor Q173, and out terminal 172b. In this way, a square wave is provided across winding T170A and therefore across load RL.

Base drive current for transistor Q170 is provided by a winding T171A of saturable core transformer T171. Similarly, base drive current for transistors Q171, Q172, and Q173 are provided by windings T171B, T171C and T171D of saturable core transformer T171. Windings T171A to T171D are magnetically coupled to a winding T171E. The current through winding T171E equals the current out of lead 176. Saturable core transformer T171 first provides base drive current for transistors Q170 and Q173. When that happens, there is a constant voltage placed across windings T171A and T171D caused by the voltage drop across a diode D170, the base emitter junction of transistor Q170, the voltage drop across a diode D173, and the base emitter junction across transistor Q173. This drives transformer T171 into saturation. When that happens, current reverses and then stops flowing into the bases of transistors Q170 and Q173 and starts flowing from windings T171C and T171B through the bases of transistors Q172 and Q171, respectively. This provides the oscillation for full-bridge inverter 170. An increase in load current through RL causes an increase in current through winding T171E which in turn causes additional base current to flow into transistors Q170 to Q173, thus causes an increase in voltage across windings T171A to T171D, and an increase in oscillation frequency.

Figure 4B:
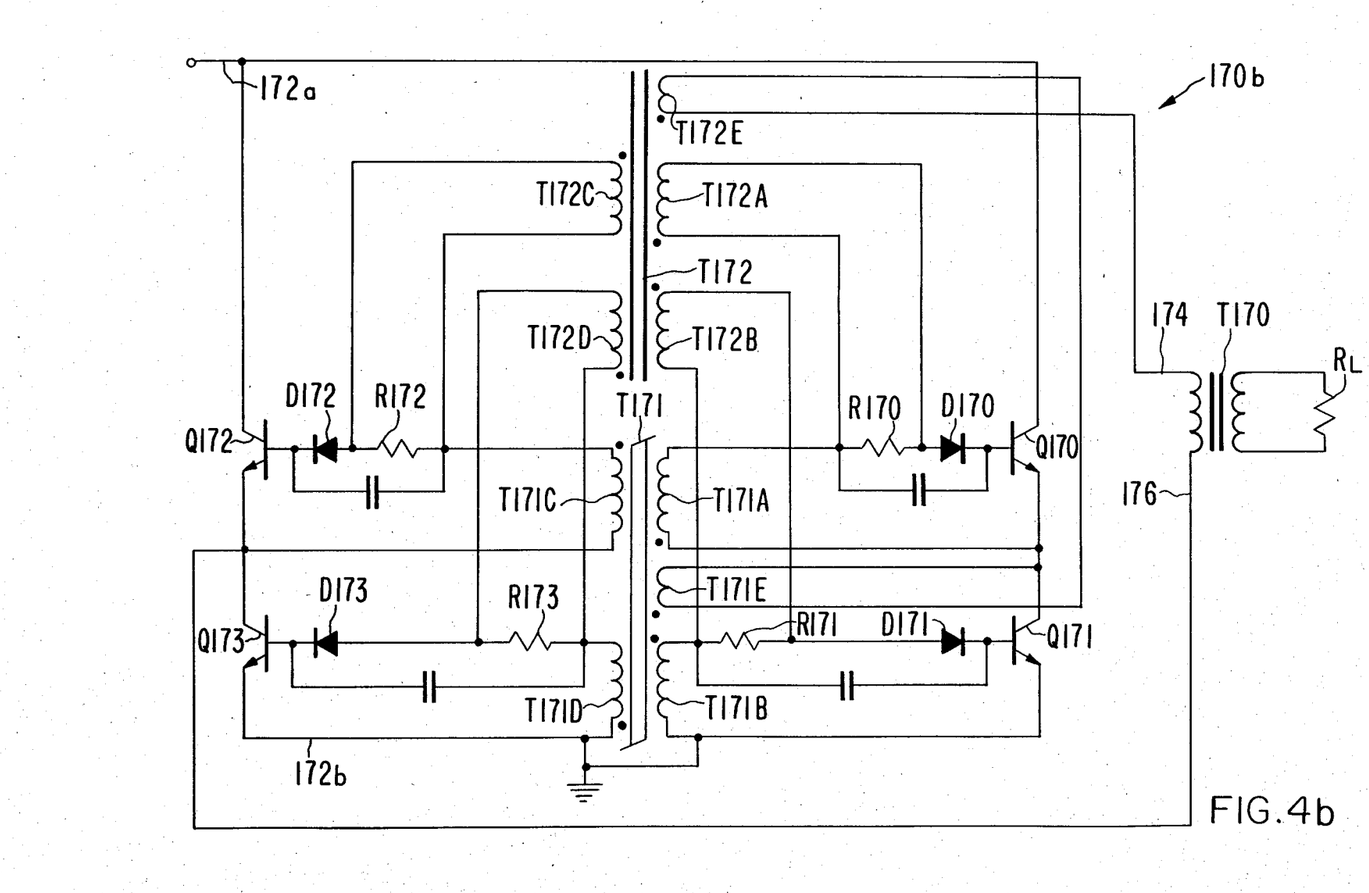

Referring now to FIG. 4b, a full-bridge inverter 170b constructed in accordance with the present invention includes a resistor R170 coupled in series between diode D170 and winding T171A. Similarly, a resistor R171 is coupled between diode D171 and winding T171B, a resistor R173 is coupled between winding T171D and diode D173 and a resistor R172 is coupled between winding T171C and diode D172. Coupled in parallel across resistors R170 to R173 are windings T172A to T172D of a transformer T172. Windings T172A to T172D are magnetically coupled to a winding T172E through which the primary winding current of transformer T171 flows. This causes a current to flow through resistor R170 in a direction such that the voltage across resistor R170 substantially offsets the voltage drop caused by the resistance of diode D170 and the base emitter resistance of transistor Q170. In addition, the current through winding T172A also offsets any current through resistor R170 caused by the current through winding T171A. Similarly, the current through winding T172B flows through resistor R171, substantially offsetting the voltage drop caused by the resistance of diode D171 and the base emitter junction of transistor Q171. Also, the current through windings T172D and T172C substantially cancel the voltage drop caused by the resistance of diode D173, the base emitter junction of transistor Q173, the resistance of diode D172, and the resistance of the base emitter junction of transistor Q172. Accordingly, the oscillation frequency of full-bridge inverter 170b is substantially unaffected by increases in base current through transistors Q170 to Q173 caused by an increase in current through load RL.

In one embodiment of this invention, windings T171A to T171D have 8 turns, windings T172E and T171E have 1 turn, and windings T172A to T172D have less than 8 turns, e.g., 7 turns.

Those skilled in the art will recognize that diodes may be coupled across resistors R170 to R173 in order to limit the voltage across resistors R170 to R173. This prevents the voltage rise across resistors R170 to R173 from becoming so large that the oscillation period of inverter 170b increases to the point that transformer T170 goes into saturation.

While this invention has been explained with reference to particular embodiments, those skilled in the art will realize that minor modifications can be made without departing from the spirit and scope of the invention. For example, the windings ratio across the transformers can be modified to obtain a greater or lesser amount of voltage drop cancellation. In addition, PNP or NPN transistors can be used. Accordingly, all such changes come within the scope of the current invention as delineated by the following claims.

I claim:

1. A circuit comprising:
   an output transformer having a primary winding and a secondary winding, said secondary winding being adapted to provide a load current;
   a transistor having a collector, a base, and an emitter, said emitter being coupled to said primary winding of said output transformer, current through the base of said transistor increasing in response to an increase in said load current;
   a second transformer having a saturable core, said second transformer being coupled across the base emitter junction of said transistor; and
   negative resistance means coupled between said second transformer and the base of said transistor, said negative resistance means tending to cancel the increase in the base emitter voltage drop of said transistor occurring when the load current of said output transformer increases.

2. The circuit of claim 1 further comprising a diode connected serially between said negative resistance means and the base of said transistor, said negative resistance means cancelling the increase in voltage drop across said diode in response to an increase in said load current.

3. The circuit of claim 1 wherein said negative resistance means comprises:
   a resistor coupled in series between the base of said transistor and said second transformer; and
   a third transformer having a first winding coupled across said resistor and a second winding coupled in series with the collector of said transistor, said second transformer also having a winding coupled in series with the collector of said transistor.

4. The circuit of claim 1 comprising voltage means for preventing the voltage across said negative resistance means from exceeding a predetermined voltage.

5. The circuit of claim 4 wherein said voltage means is a diode coupled across said negative resistance means.

6. An inverter comprising:
   a first input terminal;
   a second input terminal;
   a saturable core transformer having a first winding, a second winding, a third winding, and a fourth winding, a first lead of said first winding being coupled to said first input terminal, a first lead of said fourth winding being coupled to said second input terminal;
   a second transformer having a first winding coupled in series to the first winding of said saturable core transformer, said second transformer also having a second winding, a third winding, and a fourth winding, said fourth winding of said second transformer being coupled in series to the fourth winding of said saturable core transformer;
   a first transistor having a collector coupled to said first winding of said second transformer and an emitter coupled to a first lead of the second winding of said saturable core transformer;
   a first resistor coupled between the base of said first transistor and a second lead of the second winding of said saturable core transformer, said first resistor also being coupled across the second winding of said second transformer;
   a second transistor having a collector coupled to the emitter of said first transistor and an emitter coupled to a first lead of the third winding of said saturable core transformer and the fourth winding of said second transformer;
   a second resistor coupled between the base of said second transistor and the second lead of the third winding of said saturable core transformer, said resistor also being connected across the third winding of said second transformer; and
   an output transformer coupled to the emitter of said first transistor and the collector of said second transistor, said third transformer having a pair of output terminals.

7. The inverter of claim 6 wherein said output transformer includes a primary winding, a first lead of said primary winding being coupled to the emitter of said first transistor and the collector of said second transistor, said primary winding including a second lead, said inverter further comprising a first capacitor between said second lead of said primary winding of said output transformer and said first input terminal, said inverter including a second capacitor between said second lead of said primary winding of said output transformer and said second input terminal.

8. An inverter comprising:
   an input terminal;
   an output transformer having a primary winding and a secondary winding, said primary winding having a center tap coupled to said input terminal, said primary winding having a second output tap and a third output tap;
   a first transistor having a collector coupled to said second output tap, said first transistor having an emitter coupled to ground, said first transistor having a base;
   a second transistor having an emitter coupled to ground and a collector coupled to said third output tap, said second transistor having a base;
   first base means for providing a base current for said first transistor, the current provided by said first base means increasing in response to an increase in current through the secondary winding of said output transformer;
   second base means for providing base current for said second transistor, the current flowing through said second base means increasing in response to an increase in current through said secondary winding of said output transformer;

first negative resistance means coupled between the base of said first transistor and said first base means for providing an offset voltage tending to cancel an increase in the base emitter voltage drop of said first transistor caused in response to said increase in current from said first base means; and second negative resistance means coupled between said second base means and the base of said second transistor, said second negative resistance means providing a voltage drop tending to cancel an increase in voltage between the base and emitter of said second transistor caused in response to said increase in current from said second base means.

9. The inverter of claim 9 wherein said first base means comprises a first winding of a saturable core transformer, and said second base means comprises a second winding of said saturable core transformer.

10. The inverter of claim 9 wherein said saturable core transformer comprises a third winding, the collector current of said first transistor also flowing through said third winding, said saturable core transformer further comprising a fourth winding, the collector current of said second transistor also flowing through said fourth winding.

11. The inverter of claim 10 wherein said first negative resistance means comprises a first resistor coupled in series with the base of said first transistor, said first negative resistance means further comprising first negative current means for providing a current through said first resistor, the current being provided by said first negative current means tending to cancel said increase in the base emitter voltage drop of said first transistor.

12. The inverter of claim 11 wherein said first negative current means comprises a transformer having a first winding coupled in series with said collector of said first transistor and a second winding coupled in parallel across said first resistor.

13. The inverter of claim 12 further comprising a diode in series with the base of said first transistor, the voltage across said first resistor tending to cancel an increase in the voltage drop across said diode caused by said increase in current provided by said first base means.

14. The inverter of claim 8 wherein said first negative resistance means comprises:
a resistor coupled between said first base means and the base of said first transistor, and a first current source, current from said first current source flowing through said first resistor, the current provided by said first current source being proportional to the collector current of said first transistor, the current through said first resistor flowing in a direction tending to cancel the base emitter voltage drop of said first transistor; and
wherein said second negative resistance means comprises a second resistor coupled between said second base means and the base of said second transistor, said second negative resistance means including a second current source, the current through said second current source being proportional to the collector current of said second transistor, current from said second current source flowing through said second resistor in a direction causing a voltage drop across said second resistor tending to cancel the base emitter voltage drop of said second transistor.

15. An inverter comprising:
a first input terminal and a second input terminal;
a first transistor having a base, collector, and emitter, the collector of said first transistor being coupled to said first input terminal;
an output transformer having a primary winding and a secondary winding, said primary winding having a first lead coupled to the emitter of said first transistor, said primary winding have a second lead;
a second transistor having a collector coupled to said first lead of said primary winding, said second transistor having an emitter coupled to said second input terminal, said second transistor having a base;
a third transistor having a collector coupled to said first input terminal, said third transistor having an emitter coupled to said second lead of said primary winding, said third transistor having a base;
a fourth transistor having a collector coupled to said second lead of said primary winding, said fourth transistor having an emitter coupled to said second input terminal, said fourth transistor having a base;
first means for providing base current for said first transistor, the current provided by said first means increasing in response to an increasing current through the secondary winding of said output transformer;
second means for providing base current into said second transistor, the current provided by said second means increasing in response to said increase in current through the secondary winding of said output transformer;
third means for providing base current through said third transistor, the current provided by said third means increasing in response to said increase in current through said secondary winding of said output transformer;
fourth means for providing base current through said fourth transistor, the current provided by said fourth means increasing in response to said increase in said current through said secondary winding of said output transformer; and
first negative resistance means coupled between the base of said first transistor and said first means, said first negative resistance means providing a voltage drop tending to cancel an increase in the base emitter voltage drop of said first transistor caused by said increase in current provided by said first means.

16. The inverter of claim 15 wherein said first negative resistance means comprises:
a resistor coupled in series with the base of said first transistor; and
a first current source coupled across said resistor, the current provided by said current source causing a voltage drop across said resistor tending to cancel said increase in the base emitter voltage drop of said first transistor.

17. The inverter of claim 16 wherein said first current source is a first transformer having a winding coupled across said resistor.

18. The inverter of claim 17 further comprising a diode connected across said resistor, said diode preventing the voltage across said resistor from exceeding a predetermined limit.

19. The inverter of claim 15 further comprising:
second negative resistance means coupled between said second means and the base of said second transistor for providing a voltage drop tending to cancel an increase in the base emitter voltage drop

MISSING PAGE TEMPORARY NOTICE

PATENT # 4638420     FOR ISSUE DATE 1-20-87

HAS BEEN SCANNED, BUT WITH MISSING PAGE(S). UPON RECEIVING OF MISSING PAGE(S), THE ENTIRE DOCUMENT WILL RE RESCANNED. PLEASE CALL IMAGE DATA ADMINISTRATION STAFF OF 557-6154 IF YOU HAVE A QUESTION. ASK FOR DAVE GROOMS, ANITA YOUNG OR POLA JONES.

THIS NOTICE IS FOR THE MISSING PAGE CONTAINING:

COLUMN # 13 to end

UNITED STATES PATENT AND TRADEMARK OFFICE
CERTIFICATE OF CORRECTION

PATENT NO. : 4,638,420
DATED : January 20, 1987
INVENTOR(S) : Charles O. Forge

It is certified that error appears in the above-identified patent and that said Letters Patent is hereby corrected as shown below:

Col. 2, line 26, delete "lenght" and replace with --length--.

Col. 4, line 6, insert a comma after the second quotation mark.

Col. 5, line 39, delete "capacitor D103" and replace with --capacitor C103--.

Col. 6, line 3, delete "T1023A" and replace with --T103A--.

Col. 11, line 14, "claim 9" should read --claim 8--.

Col. 14, line 40, delete "winding" and replace with --windings--.

Col. 14, line 42, delete "windings" and replace with --winding--.

Signed and Sealed this

Twenty-fifth Day of August, 1987

*Attest:*

DONALD J. QUIGG

*Attesting Officer*   *Commissioner of Patents and Trademarks*